Aug. 13, 1935.  J. R. SNYDER  2,011,460
SHOCK ABSORBER
Filed March 26, 1930  3 Sheets-Sheet 1

Inventor:
Jacob R. Snyder
Kwis Hudson & Kent
attys

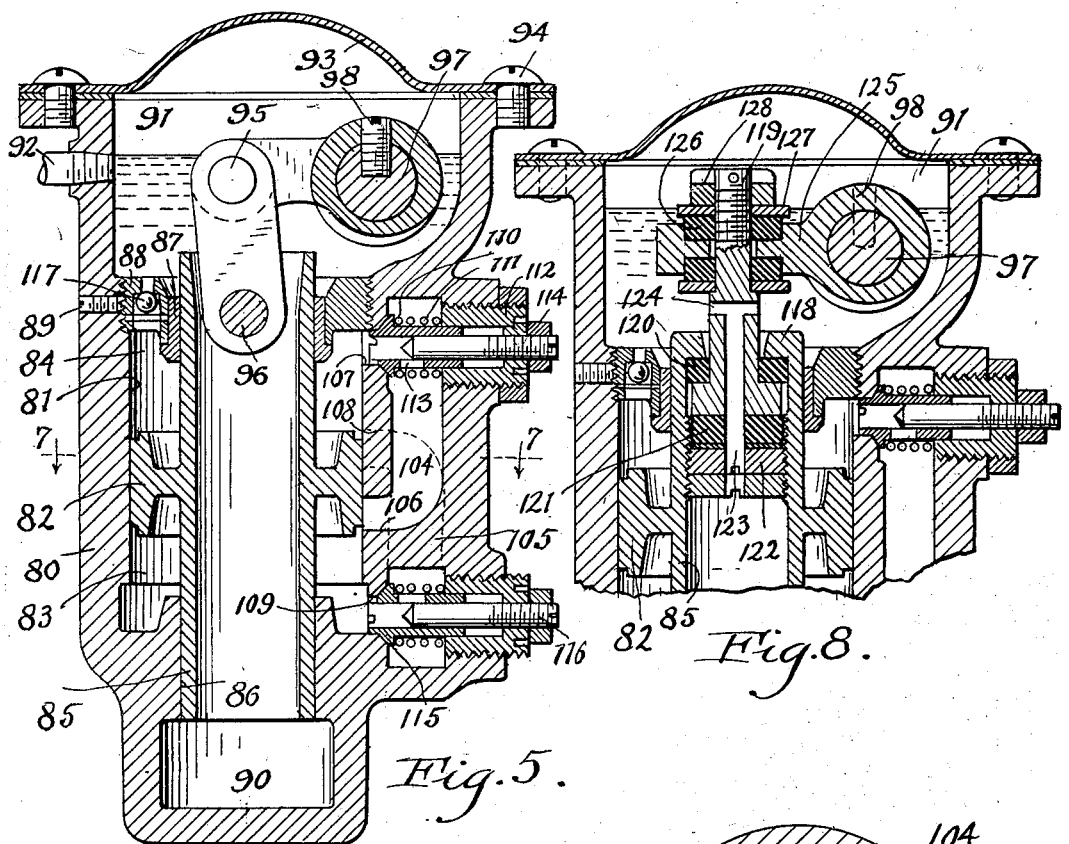
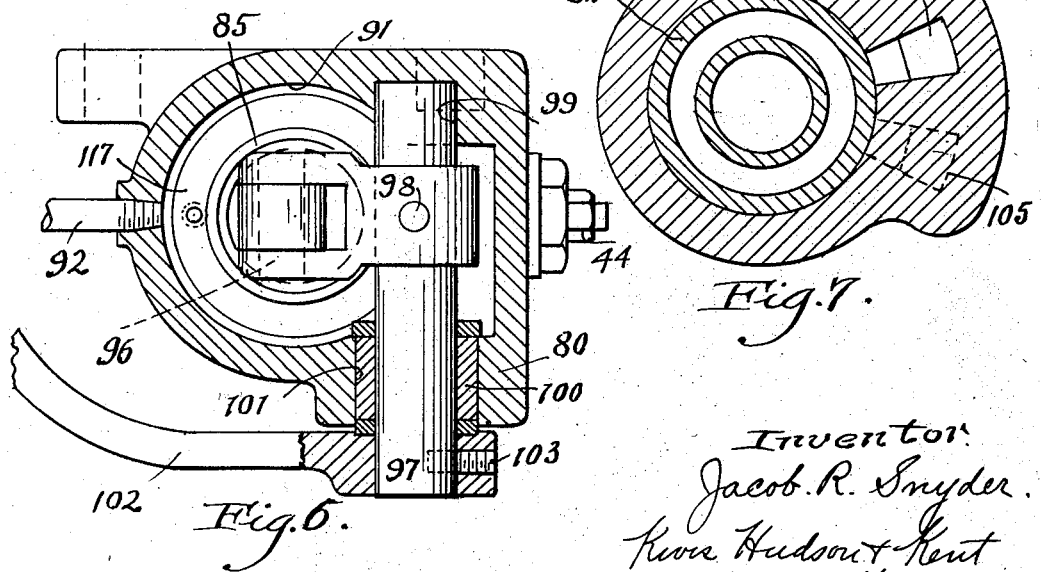

Aug. 13, 1935.                J. R. SNYDER                2,011,460
                             SHOCK ABSORBER
                       Filed March 26, 1930          3 Sheets-Sheet 3

Inventor
Jacob R. Snyder.
Kwis Hudson & Kent
attys

Patented Aug. 13, 1935

2,011,460

UNITED STATES PATENT OFFICE 2,011,460

SHOCK ABSORBER

Jacob R. Snyder, Mount Lebanon, Pa.

Application March 26, 1930, Serial No. 438,987

11 Claims. (Cl. 188—88)

This invention relates to a two-way hydraulic shock absorber, and has for one of its objects to provide such a device which is simple in construction, efficient in operation, and inexpensive to manufacture.

Another object of the present invention is to provide a shock absorber of the type referred to which affords the necessary resistance to the four operating conditions of the shock absorber, namely, from neutral to maximum compression; back to neutral; from neutral to maximum rebound; and back to neutral.

Another object of the present invention is to provide adjustable means whereby any desired resistance is obtainable for opposing the four movements constituting a cycle of operations.

A further object of the invention is to provide a device of the character referred to which will effectively resist gradual relative movements in both directions between the chassis and axle of a motor vehicle to which the device is attached, as well as quick or severe movements.

With the objects above indicated and other objects hereinafter explained in view, the invention consists in the construction and combination of elements hereinafter described and claimed.

Referring to the drawings,

Fig. 5 is a vertical sectional view of the shock absorber, showing a modified arrangement embodying the invention.

Fig. 6 is a transverse sectional view taken at the upper part of the shock absorber, and showing the mounting for the link connection.

Fig. 7 is a transverse sectional view taken on line 7—7 of Fig. 5.

Fig. 8 is a fragmentary sectional view showing a modified form of the link connection.

Figure 1:
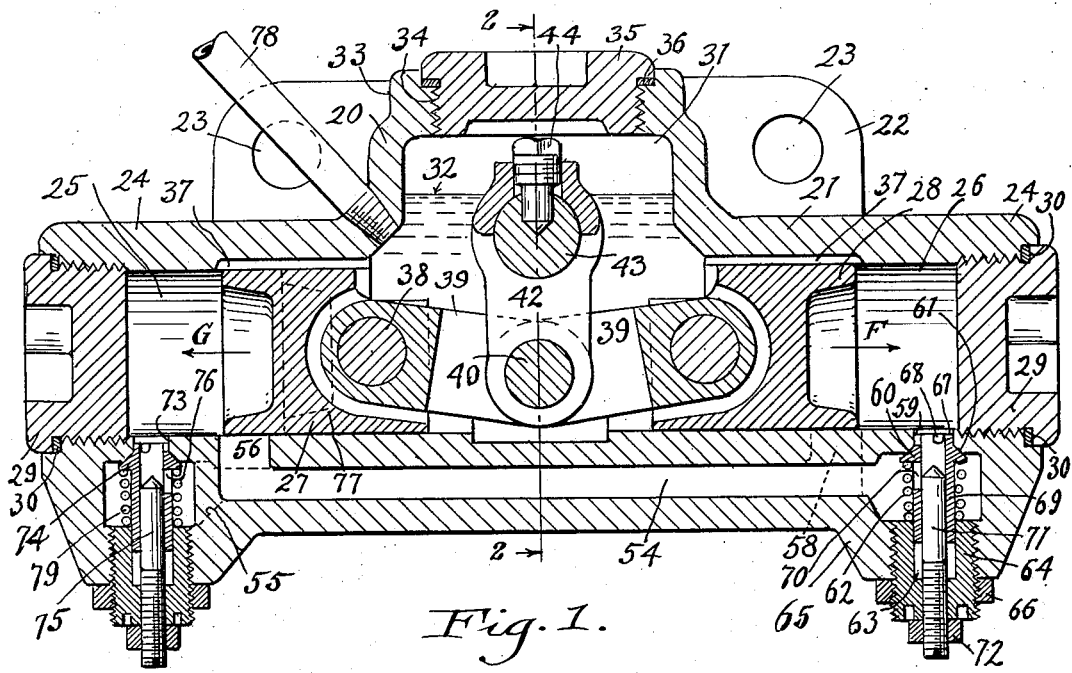
Fig. 1 is a longitudinal sectional view of a shock absorber embodying the present invention.

In the drawings, the shock absorber is represented generally by the numeral 20 and consists of a housing 21 of cast iron or other suitable material which has formed integral therewith and at its rear portion an attaching flange 22 provided with transverse openings 23 which are adapted to receive bolts by which the shock absorber is rigidly attached to the chassis of a motor vehicle, in the well known manner.

The housing 21 is provided with longitudinally extending, diametrically opposite extensions 24 which are provided with axially aligned bores 25 and 26, the surfaces of which are preferably machined or otherwise suitably finished to receive therein reciprocating pistons 27 and 28 respectively. The outer ends of the extensions 24 are interiorly screw-threaded to receive screw-threaded plugs 29 which, when screwed into place, close the ends of the bores 25 and 26 respectively. The connection between the plugs 29 and the ends of the extensions 24 are rendered oil-tight by means of washers 30.

The housing 21 adjacent its center portion is provided with a chamber 31 which will be termed the low pressure chamber and is adapted to receive and retain the necessary amount of fluid, the normal height being indicated by the line 32. This fluid may be of any of the well known types employed for this purpose, such as glycerine or any other fluid having the proper viscosity.

The chamber 31 is enclosed by a dome or upwardly extending wall 33 which has an opening 34 which is interiorly screw-threaded and adapted to receive a screw-threaded plug 35. This screw-threaded plug 35 is disposed directly above the chamber 31 and is principally provided for the purpose of assembling the shock absorber and for access in case of repair, and the connection between the plug and the dome 33 is rendered oil-tight by a washer 36.

Longitudinally extending grooves 37 are provided in the upper portions of the tubular extensions 24 adjacent the peripheries of the bores 25 and 26 and also adjacent the inner ends of the bores. These grooves 37 are of sufficient length to overlap the portions of the pistons 27 and 28 adjacent the grooves and comunicate with the bores 25 and 26, which will be termed the high pressure chambers, and the low pressure chamber 31 which contains the main body of oil. It will, therefore, be seen that the necessary amount of oil is always maintained in the high pressure chambers 25 and 26, and as the area of these grooves is so small, they do not have any effect upon the efficiency of the shock absorber.

Figure 2:
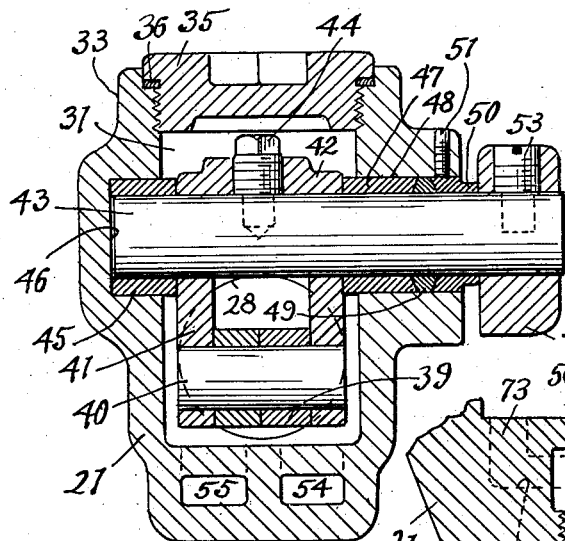
Fig. 2 is a transverse vertical sectional view taken on line 2—2 of Fig. 1.

These pistons 27 and 28 may be of any suitable material cast or otherwise formed, and at their inner adjacent ends are pivotally connected by pins 38 to links 39 which latter have their inner ends pivotally connected by a pin 40 to the depending arms 41 of a yoke 42. The yoke 42 has a transverse bore which receives a pin 43 and to which it is locked against relative rotation by a set-screw 44 which is mounted in the upper portion of the yoke 42 in such a position as to be accessible through the plug 35. One end of the pin 43, the rear end as illustrated in the drawings, is movably supported in a bushing 45 secured within a counterbore 46 provided upon the inner side of the rear wall of the housing, as shown in Fig. 2. The opposite end of the pin 43 is supported within a bushing 47 secured within a transverse opening 48 in the front wall of the housing, as shown in Fig. 2, and to render the connection between the pin 43 and the bushing 47 oil-tight, a packing ring 49 of suitable material encircles the pin 43 and is held in contact with the outer end of the bushing 47 by means of a packing gland 50. This packing gland 50 is moved inwardly to its proper position and is maintained in place by a set-screw 51 in the housing 21. An arm or lever 52 has one end connected to the end of the pin 43 by a set-screw 53, while the opposite end is adapted for attachment with a connecting link secured to the spring or axle in the usual manner. It will therefore be seen that when the pin 43 is moved in a clockwise direction, by reason of the movement of the arm 52, the pistons 27 and 28 will move toward the left, as indicated by the arrow G, this movement representing the rebound stroke between the chassis and the spring or axle. When the pin 43 is moved in a counter-clockwise direction by reason of movement of the arm 52, the pistons 27 and 28 will be moved in the direction indicated by the arrow F, this movement representing the compression stroke between the chassis and the spring or axle. The relative position of the pistons 27 and 28 with respect to the bores 25 and 26 respectively, as shown in Fig. 1, represents the neutral position of the shock absorber.

The high pressure chambers 25 and 26 are, respectively, in fluid communication through passageways 54 and 55 which extend longitudinally and at the lower portion of the housing 21. The passageway 54, which is shown in full lines in Fig. 1, communicates with the high pressure chamber 25 through a laterally extending opening 56 which is positioned with respect to the piston 27 while in its normal position, as shown in Fig. 1, so that there is a very slight opening between the outer end of the piston and the end of the opening in the wall of the extension. It will therefore be seen that the piston does not only function as such but at the same time operates as a slide valve with respect to the opening 56, the purpose of which will be hereinafter more fully described. A passageway 55 communicates in a like manner, as explained with respect to the passageway 54, except that it communicates by a laterally extending opening 58 with the high pressure chamber 26, the position of the opening 58 having the same relation with respect to the piston 28 as does the opening 56 with respect to the piston 27.

The opposite end of the passageway 54 communicates with the high pressure chamber 26 through a laterally extending opening 59 which extends through the wall of the extension adjacent the inner end of the plug 29 or beyond the normal stroke of the piston 28 in the direction indicated by the arrow F. This opening 59 is controlled by a valve which comprises a valve head 60 which engages a valve seat 61 provided at the lower end of the opening 59. The valve 60 is maintained in engagement with its seat 61 by means of a coil spring 62 and is slidably mounted within a centrally extending bore 63 of a screw-threaded plug 64. This plug is adjustably mounted in an extension 65 at the lower portion of the housing 21 and is maintained in adjusted position by means of a lock nut 66, the adjustment of the plug controlling the tension exerted by the spring 62 to maintain the valve 60 in its closed position. The lower end of the valve 60 is guided in its movement within the opening 59 by an extension 67 on the end of the valve, and to permit quick passage of the fluid from the high compression chamber 26 through the valve when it is lifted from its seat, a plurality of transverse openings 68 are provided.

The sleeve 69 of the valve 60 has a transverse opening 70 adjacent the valve head 60 and positioned so as to provide for constant fluid communication between the passageway 54 and the high compression chamber 26. The flow of fluid through the opening 70 is controlled by means of a needle valve 71 which is mounted for movement within the sleeve 69 and is adjustable by means of its upper screw-threaded end which is mounted within the screw-threaded plug 64, as shown in Fig. 1. This needle valve is, therefore, adjustable longitudinally of the sleeve 69, and its lower end being tapered provides for a very fine adjustment to control the flow of fluid through the opening 70. The needle valve may be locked in place by a lock nut 72.

As the end of the passageway 55 opposite the lateral opening 58 is connected through a lateral opening 73 with the high pressure chamber 25 by means of a valve 74 in precisely the same manner as the valve 60, and as the needle valve 75 controls the flow of fluid through the opening 76 in the sleeve of the valve 74, in precisely the same manner as the needle valve 71 controls the passage of fluid through the opening 70, it is not believed necessary to repeat the description of the specific mountings of this latter set of members. A pipe 78 is threaded into the housing 21 and communicates with the low pressure chamber 31 and provides suitable means for supplying fluid to the low pressure chamber.

In the operation of the device, we will assume the relationship of the parts to be as shown in Fig. 1, which we will term the neutral position and which position the parts assume when the shock absorber is properly attached to a motor vehicle.

Figure 3:
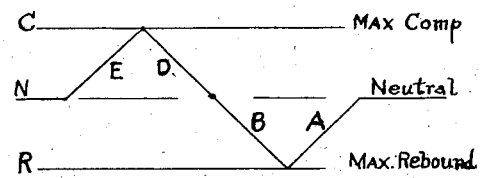
Fig. 3 is a chart illustrating graphically the cycle of operations of the shock absorber embodying the present invention.

It should also be understood that the lines E, D, B and A of the chart illustrated in Fig. 3 are indicative of the direction of movement of the end of the arm 52 which is attached to the shock absorber and further represents the relative position of the end of the arm 52 with respect to its neutral position represented by the line N, during the deflection of the springs and the rebound.

On the compression stroke where the springs and axle are caused to move toward the chassis, the piston 28 is moved in the direction indicated by the arrow F. The movement of the piston forces the fluid in the high pressure chamber 26 through the opening 59 which unseats the valve 60 against the tension of the spring 62, thereby permitting the fluid to pass through the passageway 54 and through the opening 56 into the high pressure chamber 25. The passage of the fluid into the high pressure chamber 25 is permitted due to the fact that the piston 27 has also been moved to the right past the opening 56 to a position approximating that represented by dotted lines 77. Of course if the deflection of the springs is slight, the movement of the piston 28 will probably not create sufficient pressure to unseat the valve 60 and, therefore, the fluid from the high pressure chamber 26 is permitted to flow through the central opening in the valve 60 and out through the opening 70 in the side wall of sleeve 69. The amount of resistance offered, therefore, to the compression stroke from its neutral position to maximum compression, as represented by the line E, is controlled by placing the spring 62 under the desired tension to resist the unseating of the valve 60.

On the rebound stroke of the operation, represented by the line D and being the return of the spring with respect to the chassis from its maximum compression to neutral position, the piston 27 is caused to move in the direction indicated by the arrow G. As the piston 27 is in the position indicated by the dotted lines 77, the initial movement of the piston in the direction of the arrow G forces the liquid in the high pressure chamber through the opening 56. This fluid then passes through the passageway 54, and as it cannot pass by the valve 60, it is permitted to pass through the opening 70 in the sleeve 69 and thence through the central opening in the sleeve and into the high compression chamber 26. The resistance to this movement of the piston 27 is therefore controlled by the needle valve 71, the latter being adjustable so as to control the flow of fluid through the opening 70, and thus any desired resistance to this stroke may be obtained. At the end of this stroke, the piston 27 has returned to its neutral position, as represented by full lines in Fig. 2, and it will be noted that the piston functions as a slide valve to close the opening 58 in the passageway 54.

Further movement of the piston 27 in the direction indicated by the arrow G, which is represented by the line B of the chart and indicates the separation of the springs with respect to the chassis from its neutral position to its maximum rebound position, forces the fluid in the high pressure chamber 25 through the opening 73 and unseats the valve 74 against the tension of the spring 79, thus permitting the fluid to flow past the valve and through the passageway 55. The fluid then passes outwardly through the opening 58 into the high pressure chamber 26 inasmuch as the piston 28 has been moved to the left until it is positioned beyond the opening 58 similar to that represented by the dotted lines 77. The resistance offered to this stroke, therefore, can be controlled by varying the tension of the spring 79, and by such adjustment it is therefore possible to obtain any degree of resistance desired.

Upon the return stroke of the springs with respect to the chassis from the maximum rebound position to its neutral position, as indicated by the line A of the chart, the piston 28 is moved in the direction indicated by the arrow F and such movement of the piston causes the fluid in the high pressure chamber 26 to flow through the opening 58. The fluid then passes through the passageway 55, and as it cannot pass the valve 74, it is caused to pass through the opening 76 in the sleeve of the valve and through the central opening into the high pressure chamber 25. The resistance to the passage of fluid through the opening 76 is controlled by the needle valve 75 so that it is possible to obtain any degree of resistance desired.

From the foregoing description of the operation and construction of the shock absorber embodying the present invention, it is to be pointed out that one of the important features of the invention is to be able to obtain any desired resistance to the compression strokes and the rebound strokes between the springs and chassis of the motor vehicle. For example, referring again to the chart in Fig. 3, it might be desired to offer to the movement of the piston of the shock absorber from neutral to maximum compression, a resistance of 75, while from maximum compression back to neutral a resistance of 25, due to the fact that it would probably not be desirable to retard the movement of the springs and chassis from maximum compression back to neutral as much as it would be desirable to counteract the movement from neutral to maximum compression. The same is true with checking the movement from neutral to maximum rebound which would indicate the movement of the springs away from the chassis to its maximum position. This resistance might be represented by 100 so as to prevent bottoming and then the return from maximum rebound to neutral might have a resistance of 50 so as to gradually resist the return of the springs to neutral position.

In Figs. 5, 6, and 7 there is illustrated a modification of the invention embodied in the shock absorber to the extent that a single reciprocating piston is employed between the high pressure chambers. Aside from this change, the operation of the shock absorber is precisely the same as that already explained with respect to Fig. 1.

A housing 80 of any suitable material, such as cast iron, is provided with a bore 81, which has disposed therein, and adapted to be reciprocated back and forth, a piston 82 which divides the bore 81 into a pair of high pressure fluid chambers 83 and 84 respectively, for a purpose to be later described.

The piston 82 is formed preferably integral with a tubular member 85, the lower end of which is slidably mounted within an opening 86 coaxial with the bore 81, while the upper end of the tubular member 85 is slidably mounted within a bushing 87, suitably secured within a transverse opening in a ring 88. The ring 88 is exteriorly screw threaded and cooperates with the interior screw threads provided adjacent the upper portion of the bore 81. This ring 88 may be secured in place by a set screw 89 which is mounted within the wall of the housing 80.

At the lower portion of the housing 80 there is a low pressure chamber 90, while at the upper portion of the housing there is a low pressure chamber 91, which serves as a reservoir for any suitable operating fluid which is supplied to the chamber 91 through a pipe 92, or other suitable means. The low pressure chamber 90 is in fluid communication with the low pressure chamber 91 through the longitudinally extending opening in the tubular member 85. The upper end of the housing 80 is open and receives a cover 93, which is held in place by bolts 94 so as to close the opening but at the same time permits access therethrough for the purpose of inspecting the working parts of the shock absorber, and for the purpose of ready assembly.

The piston 82 is reciprocated back and forth by a link connection 95, pivotally connected at 96 to the upper end of the tubular member 85, and at the opposite end connected to the transversely extending shaft or pin 97. A set screw 98 is carried by the link connection 95 and engages with a suitable opening in the shaft or pin 97 to prevent relative rotation therebetween. One end of the shaft or pin 97 is rotatably supported in an opening 99 provided in the rear wall of the housing 80, while the opposite end of the shaft or pin 97 is mounted within a bushing 100 secured within a transverse opening 101 extending through the front wall of the housing 80, as clearly shown in Fig. 6.

A connecting arm 102 has one end mounted upon the outer end of the pin or shaft 97, and is secured against relative rotation by a set screw 103. The opposite end of the arm 102 is adapted for connection with the axle or spring of the motor vehicle by any suitable means.

The high pressure chambers 83 and 84 are in fluid communication by means of passageways 104 and 105 respectively. The passageway 104 has a laterally extending opening 106, which communicates with the high pressure chamber 83, and a laterally extending opening 107 which communicates with the high pressure chamber 84. The passageway 105 has a laterally extending opening 108, which communicates with the high pressure chamber 84 and a laterally extending opening 109 which communicates with the high pressure chamber 83. The laterally extending openings 106 and 108 are positioned in definite relationship with respect to the piston 82, as shown in Fig. 5, and their positioning should be such that when the piston is reciprocated, one of the openings is closed thereby, and the other opening is open, and vice versa.

The transverse opening 107 is normally closed by a valve 110, which is maintained in closed position by a coil spring 111. The tension of this spring 111 is varied by a screw-threaded plug 112 mounted within the housing 80. The sleeve of the valve 110 has a laterally extending opening 113 extending therethrough for the flow of fluid, and the size of the opening is variable by means of the adjustable needle valve 114. The construction and function of this valve 110 is precisely the same as the operation of the valve 60 illustrated and described with reference to Fig. 1, and consequently, further explanation is believed to be unnecessary.

The transverse opening 109 is normally closed by means of a valve 115, and inasmuch as the construction and operation of this valve is the same as that already described with reference to the valve 110, it is believed that further explanation is unnecessary.

In the operation of this device as shown in the modified form in Fig. 5, the fluid is forced from one high pressure chamber to the other high pressure chamber, depending upon the direction of movement of the piston 82. The fluid passes through the passageways 104 and 105, and the resistance to the flow of fluid is controlled by the spring actuated valves 110 and 115, as well as the needle valves 114 and 116. It will therefore be seen that when the piston 82 moves in one direction, the flow of fluid is resiliently or yieldingly resisted by means of the spring actuated valves, and when moved in the opposite direction the flow of fluid is rigidly resisted during the initial movement of the piston by means of the needle valves. It will therefore be seen that the desired resistances offered to the flow of fluid between the high pressure chambers are obtained by adjustability of the valves, so that where it is desired, different resistances are obtainable with respect to the four operating conditions as explained with reference to the chart illustrated in Fig. 3.

A check valve 117 is provided in the ring 88 and permits the fluid to flow from the low pressure chamber 91 into the high pressure chamber 84, when the fluid in the high pressure chambers has diminished for any reason whatsoever.

In Fig. 8 there is illustrated a modified form of link connection between the piston 82 and the pin or shaft 97. It is advisable to eliminate to as great an extent as possible, mechanical joints and connections which ordinarily become noisy after being in operation for a considerable length of time. The upper portion of the tubular member 85 is provided with a laterally extending flange 118 through which extends the stem of a T member 119. Disposed between the head of the T member 119 and the flange 118, is a rubber washer 120, and a second rubber washer 121 is positioned in contact with the head of the T member 119, but on the opposite side thereof. A pair of lock screws 122 cooperate with screw threads provided upon the interior of the tubular member 85, and when turned into place tend to maintain the T member 119 in assembled relation with respect to the rubber washers 120 and 121. Centrally aligned openings 123 extend through the locking members 122, the rubber washer 121 and part of the T member 119 and communicate with a transverse opening 124, thus permitting the passage of fluid from the low pressure chamber 91 through the central opening of the tubular member 85.

An arm 125, which is secured by the set screw 98 to the shaft or pin 97, has its opposite sides counterbored to receive a pair of rubber blocks 126. A pair of washers 127 engage with the opposite sides of the rubber washers 126, and are rigidly held in assembled relation by a member 128 which is pinned or otherwise secured to the free end of the T member 119. It will be noted that there is no metal to metal contact between the movable parts and that universal movement is permitted due to the resiliency of the rubber washers.

Figure 9:
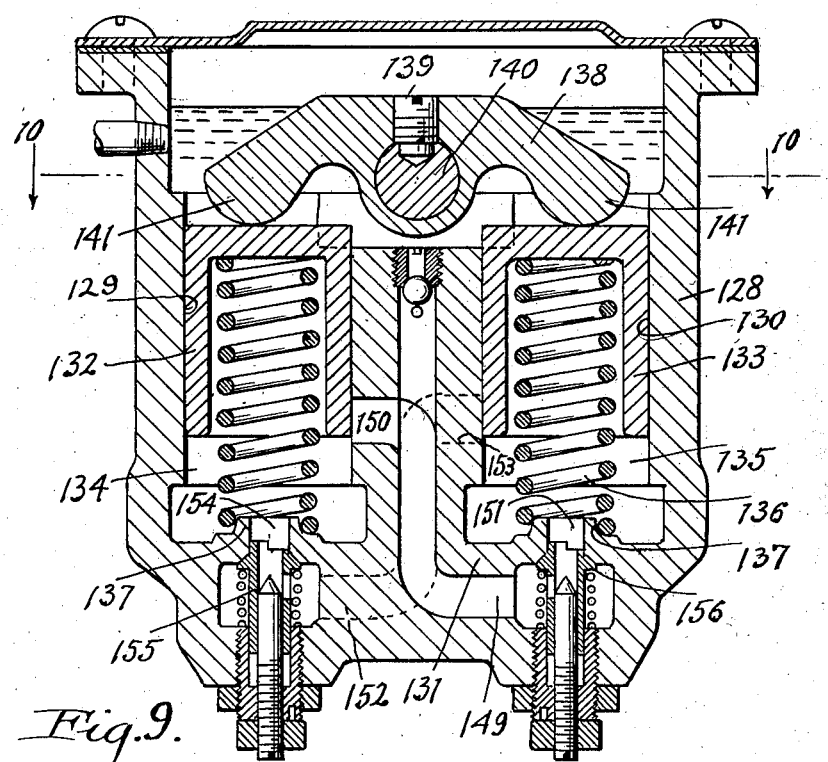
Fig. 9 is a vertical sectional view of a shock absorber embodying the present invention in a modified form.
Figure 10:
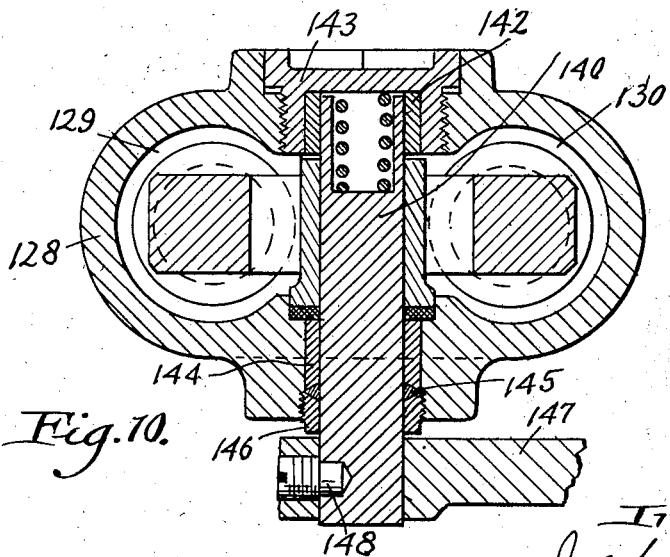
Fig. 10 is a transverse sectional view taken on line 10—10 of Fig. 9.

Referring now to Figs. 9 and 10, there is disclosed a still further modification of the structure of the shock absorber but still embodying the same invention. A housing 128 of any suitable material, such as cast iron, is provided with a pair of parallel bores 129 and 130 respectively. The bores are open at their upper ends but are closed at their lower ends by transversely extending wall or partition 131. A pair of pistons 132 and 133 respectively, all substantially U-shaped in cross section, are reciprocably disposed within the bores 129 and 130, and when so assembled provide a pair of high pressure fluid chambers 134 and 135 respectively. These pistons 132 and 133 are normally maintained in elevated position by means of coil springs 136, one end of which is disposed within the pistons and engages the closed ends thereof, while the opposite ends engage circular bosses 137 provided upon the upper surface of the transverse partition 131.

The pistons 132 and 133 are reciprocated within the bores 129 and 130 respectively, by means of a rocker arm 138, which is secured by a set screw 139 to the transverse shaft or pin 140. This rocker arm has extensions 141 provided with rounded surfaces which engage the closed ends of the pistons 132 and 133. Therefore, when the shaft or pin 140 is moved about its axis, the ends 141 of the rocker arm 138, will cause the pistons to move longitudinally against the resistance of the springs 136, depending upon the direction of movement of the shaft 140 about its axis. It will be further noted that when one piston is depressed against the tension of the spring, the other piston is moved in an opposite direction by the tension of its cooperating spring, so that alternate rocking of the rocker arm 138 causes the pistons 132 and 133 to be reciprocated alternately.

One end of the shaft 140 is journaled within a bushing 142 carried by a screw threaded plug 143 in the rear wall of the bushing, while the other end is mounted within a bushing 144, disposed within an opening in the front wall of the housing, such as shown in Fig. 10. A suitable gasket 145 surrounds the shaft 140 and is held in rigid engagement with the end of the bushing 144 by means of a screw threaded sleeve 146, to thereby prevent the passage of fluid along the shaft 140. An operating arm 147 has one end connected to the outer end of the shaft 140 by a set screw 148, while its other end is adapted for connection with the axle or springs of a motor vehicle by any suitable means.

A passageway 149 extends through the housing 128, and communicates with the high pressure chamber 134 through a laterally extending opening 150, while the opposite end communicates with the high pressure chamber 136 through an opening 151 extending centrally through the transverse partition 131 and the circular boss 137. A second passageway 152 communicates with the high pressure chamber 136, through a laterally extending opening 153, while the opposite end communicates with the high pressure chamber 134 through an opening 154 extending centrally through the circular bore 135 and the transverse partition 131.

Valve mechanisms indicated by 155 and 156 are mounted within the housing 128, and cooperate with the openings 154 and 151 respectively. As the construction and operation of the valve mechanisms are identical with the construction and operation of the valve 60 of Fig. 1, it is believed that further detailed description with respect to the operation and construction of the valve mechanisms 155 and 156, will be unnecessary, but reference to the operation of the valve mechanism in Fig. 1 may be resorted to for a more detailed explanation, if found desirable.

In the operation of the device when properly attached between the chassis and springs or axle of a motor vehicle, upon the compression stroke, the piston 132 would be depressed by movement of the rocker arm 138 against the tension of the spring 136, while the piston 133 would be raised by the tension of the spring 136, due to the counterclockwise movement of the arm 138. The depressing of the piston 132, would cause the fluid in the high pressure chamber 134 to flow through the opening 154, thereby removing the valve from its seat against the tension of the spring. The fluid would then pass through the passageway 152, and into the high pressure chamber 135, through the laterally extending opening 153. This is made possible by the fact that the piston 133 has been elevated so as to expose the opening 153. The valve mechanism 155, therefore offers, as in the case of the construction disclosed in Fig. 1, a yielding resistance to the flow of fluid from the high pressure chamber 134 to the high pressure chamber 135. On the rebound stroke the arm 138 would be moved in a clockwise position, causing the piston 133 to be depressed against the tension of the spring 136. Initial movement of the piston 133 would cause fluid in the high pressure chamber 135 to flow through the laterally extending opening 153 into the passageway 152, and through the transverse opening in the sleeve of the valve 155. This opening, as before stated, is controlled by a needle valve, and thereby the flow of fluid therethrough, is fixedly resisted. Further depression of the piston 133 causes the opening 153 to be closed thereby, and the fluid within the high pressure chamber 135 passes through the opening 151 and unseats the valve of the valve mechanism 156. The fluid is then permitted to pass by the valve into the passageway 149, and through the laterally extending opening 150, into the high pressure chamber 134. This is possible due to the fact that the piston 132 has been elevated by the tension of the spring 136, which is made possible by the clockwise rotation of the rocker arm 138. It will, therefore, be noted that the flow of fluid through the passageway 149 is yieldably resisted due to the spring controlled valve mechanism 156. Upon the initial movement of the piston 132 in its downward movement, the fluid in the high pressure chamber 134 is first forced outwardly through the laterally extending opening 150, through the passageway 149, and through the transverse opening in the sleeve of the valve of the valve mechanism 156. This opening is controlled by the needle valve as before described, and thereby a fixed resistance is presented to the flow of fluid through the high pressure chamber 134 to the high pressure chamber 135.

As previously stated, the tension of the springs of the valve mechanism 155 and 156 may be varied so as to obtain any desired resistance to the flow of fluid thereby, as well as adjustment of the needle valves for the same purpose.

Figure 4:
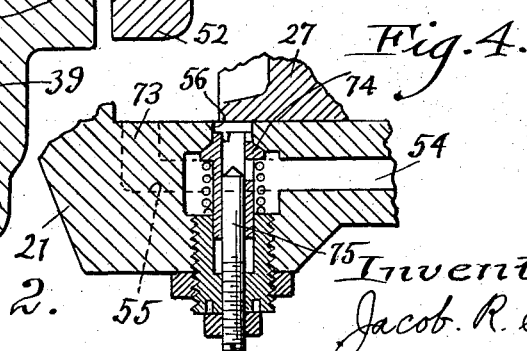
Fig. 4 is a fragmentary sectional view showing a reversal of the valve mechanism with respect to the passageways, at one end of the cylinder, it being understood that the valve mechanism is similarly reversed with respect to the passageways, at the opposite end of the cylinder.

Fig. 4 illustrates a modification of the construction of the shock absorber embodying the present invention wherein the valve mechanism 74 may be associated with the transverse opening 56 for controlling the flow of fluid therethrough between the high pressure chambers in which instance the transverse opening 73 as normally valve controlled, as shown in Fig. 1, has the valve mechanism dispensed with. The transverse opening 73 therefore communicates with the passageway 55 directly with the high pressure chamber 26. It is therefore to be understood that it is contemplated as coming within the terms of the invention to rearrange the valve mechanisms in any manner which may be desired so as to obtain the desired relative resistances to the four cycles of operation of the shock absorber.

While I have described the preferred embodiments of the invention, it is to be understood that I am not to be limited thereto, as changes and modifications may be resorted to without departing from the scope of the invention as defined in the appended claims.

Having thus described my invention, I claim:

1. In a hydraulic shock absorber, a pair of fluid chambers, fluid conducting means connecting said chambers, means for forcing the fluid from one chamber to the other through said conducting means, and means offering a fixed resistance to the flow of fluid during the initial movement of said reciprocable means and a yielding resistance during a further movement thereof in the same direction.

2. In a hydraulic shock absorber, a pair of fluid chambers, fluid conducting means connecting said chambers, means for forcing the fluid from one chamber to the other through said conducting means, means offering a yielding resistance to the flow of fluid during the initial movement in one direction and a fixed resistance to the flow of fluid in the further movement in the same direction, and means for adjusting the last mentioned means whereby any desired resistance may be obtained.

3. In a hydraulic shock absorber, a pair of fluid chambers, a plurality of passageways having their opposite ends connecting said chambers, means for forcing the fluid from one chamber to the other through said passageways, and means offering a fixed resistance to the flow of fluid in one direction and a yielding resistance to the flow of fluid in the opposite direction between said chambers.

4. In a hydraulic shock absorber, a pair of fluid chambers, passageways connecting said chambers, means for forcing the fluid from one chamber to the other through said passageways, means offering a fixed resistance to the flow of fluid in one direction and a yielding resistance to the flow of fluid in the opposite direction through one of said passageways, and means offering a fixed resistance to the flow of fluid in one direction and a yielding resistance to the flow of fluid in the opposite direction through the other of said passageways.

5. In a hydraulic shock absorber, a pair of fluid chambers, passageways having their opposite ends connecting said chambers, means for forcing the fluid from one chamber to the other through said passageways, and means offering first a fixed resistance and subsequently a yielding resistance to the flow of fluid in one direction from one chamber to the other.

6. In a hydraulic shock absorber, a pair of fluid chambers, passageways having their opposite ends connecting said chambers, means for forcing the fluid from one chamber to the other through said passageways, means offering a yielding resistance to the flow of fluid in one direction and a fixed resistance to the flow of fluid in the opposite direction, and adjustable means for varying the yielding resistance.

7. In a hydraulic shock absorber, a pair of fluid chambers, passageways having their opposite ends connecting said chambers, reciprocable means for forcing the fluid from one chamber to the other through said passageways, means offering a yielding resistance to the flow of fluid in one direction and a fixed resistance to the flow of fluid in the opposite direction, and adjustable means for varying the fixed resistance.

8. In a hydraulic shock absorber, a pair of fluid chambers, passageways having their opposite ends connecting said chambers, reciprocable means for forcing the fluid from one chamber to the other through said passageways, means offering a yielding resistance to the flow of fluid in one direction and a fixed resistance to the flow of fluid in the opposite direction, and adjustable means for varying the yielding and fixed resistances.

9. In a hydraulic shock absorber, a pair of fluid chambers, passageways connecting said chambers, means for forcing the fluid from one chamber to the other through said passageways, means offering a fixed resistance to the flow of fluid in one direction through one passageway, said flow being cut off by movement of said fluid forcing means, and means subsequently offering a yielding resistance to said flow of fluid in the same direction through the other passageway.

10. A shock absorber for resisting the relative movements between two movable members from a neutral position to maximum travel in opposite directions and return, comprising means operatively connected to one of the movable members and movable thereby, means for supporting said movable means and connected with the other of said movable members, means offering different resistances to the movements of said movable members from neutral position to maximum travel away therefrom, and means offering different fixed resistances to the movements of said movable members from maximum travel to neutral position.

11. A shock absorber for resisting the relative movements between two movable members from a neutral position to maximum travel in opposite directions and return, comprising means operatively connected to one of the movable members and movable thereby, means for supporting said movable means and connected with the other of said movable members, and means offering yielding resistances to the movements of said movable members from neutral position to maximum travel and fixed resistances from maximum travel to neutral position.

JACOB R. SNYDER.